N. A. LYBECK.
OYSTER DREDGING AND MANIPULATING MACHINE.
APPLICATION FILED DEC. 24, 1909.

991,333.

Patented May 2, 1911.

N. A. LYBECK.
OYSTER DREDGING AND MANIPULATING MACHINE.
APPLICATION FILED DEC. 24, 1909.

991,333.

Patented May 2, 1911.

N. A. LYBECK.
OYSTER DREDGING AND MANIPULATING MACHINE.
APPLICATION FILED DEC. 24, 1909.

991,333.

Patented May 2, 1911.
9 SHEETS—SHEET 5.

Fig. 5

WITNESSES:

INVENTOR
Nils A. Lybeck
BY
ATTORNEYS

N. A. LYBECK.
OYSTER DREDGING AND MANIPULATING MACHINE.
APPLICATION FILED DEC. 24, 1909.

991,333.

Patented May 2, 1911.

WITNESSES

INVENTOR
Nels A. Lybeck
BY
ATTORNEYS

UNITED STATES PATENT OFFICE.

NELS A. LYBECK, OF HOG ISLAND, RHODE ISLAND.

OYSTER DREDGING AND MANIPULATING MACHINE.

991,333.  Specification of Letters Patent.  Patented May 2, 1911.

Application filed December 24, 1909. Serial No. 534,752.

*To all whom it may concern:*

Be it known that I, NELS A. LYBECK, a citizen of the United States, and a resident of Hog Island, in the county of Bristol and State of Rhode Island, have invented a new and Improved Oyster Dredging and Manipulating Machine, of which the following is a full, clear, and exact description.

Among the principal objects which the present invention has in view are: to provide means whereby oysters may be elevated from the bed, inspected, and after having had the predatory foes detached therefrom, transplanted; to provide means whereby the oysters may be elevated from the bed, sorted, and transplanted with reference to the sorting; to provide means whereby the foes of the oyster may be captured and exterminated; to provide means for clearing, cultivating and leveling the oyster bed; to provide a mechanism for performing the above mentioned functions whereby may be amplified the working capacity of the labor employed in the tending and care of the oysters and oyster beds; to provide means automatic in character for distributing the load as and when received in the dredging machine; to provide means for automatically delivering the load from the dredger to conveying vessels held in operative relation to the said dredger; to provide means for turning the dredging machine upon a self-contained center; to provide a construction of an oyster scoop and devices attached thereto which is constructed to ride upon the oyster bed; and to provide tools, accessories and operative parts incorporated in and forming part of the dredging machine, which are simple, efficient and durable in construction and operation; and to provide a continuous system for distributing oysters and shells from the initial operation of removal from and to the return to the bed.

One embodiment of the present invention is disclosed in the structure illustrated in the accompanying drawings, in which like characters of reference denote corresponding parts in all the views, and in which—

The dredging machine illustrated in the accompanying drawings consists in a body or hull 31. The forward end of the hull is divided, forming a passage in which an elevator frame 32 is permitted to rise and fall. The elevator 32 is pivoted at 80 upon vertical stanchions 34, 34 fixedly mounted upon the hull 31 and forming part of the dredging machine. The stanchions 34, 34 are joined by stringers 35, 35, which are extended forward along the edge of the passage formed for the elevator 32, and upon which a pilot house 36 is erected. Between the stanchions 34, 34 and the framing formed thereby are extended the various shafts forming the pivotal mounting for the conveyers employed in delivering the oysters and their foes or debris when the same are raised by the said elevator 32.

Figure 3:
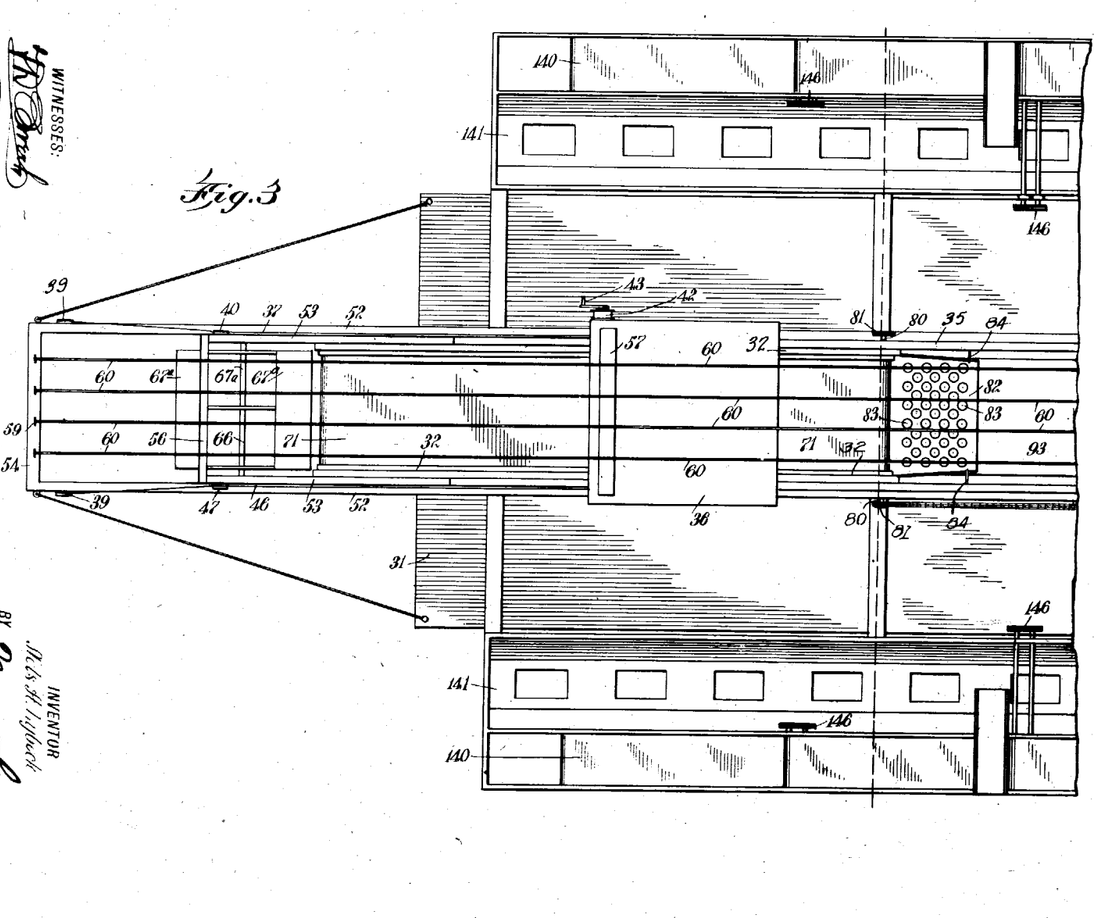
Fig. 3 is a fragmentary view in plan, of the part of the machine as illustrated in Fig. 1.
Figure 4:
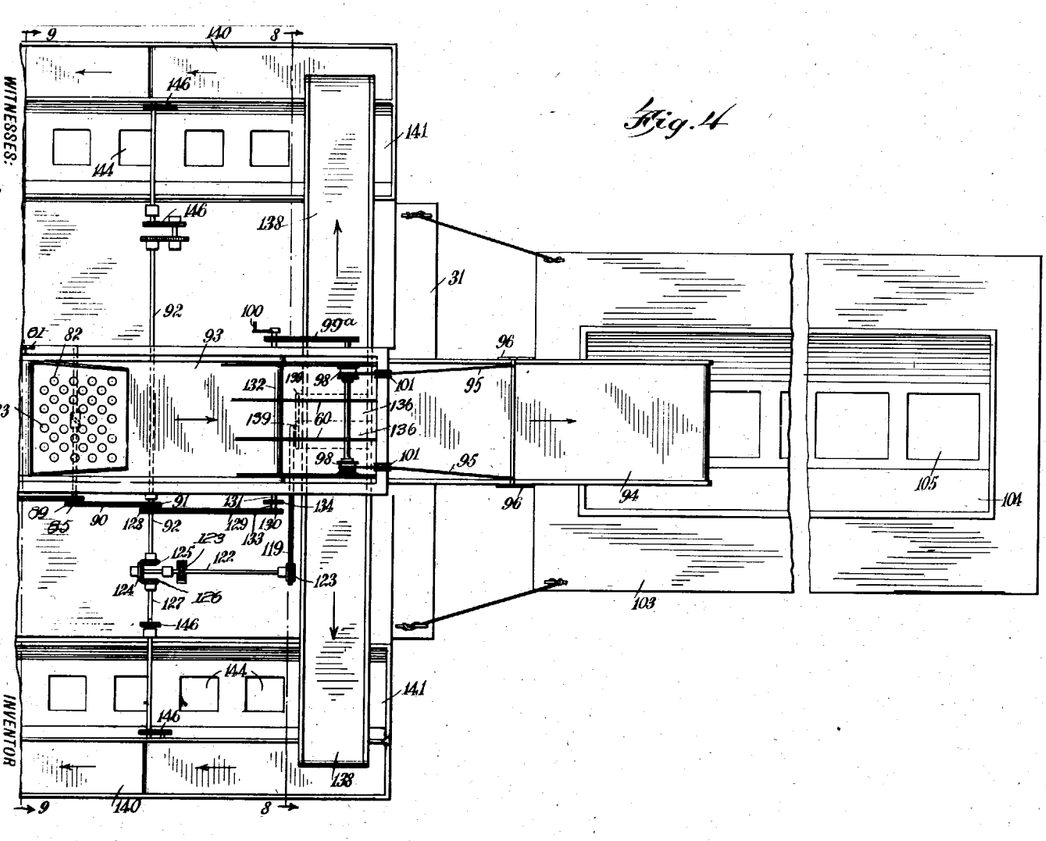
Fig. 4 is a fragmentary view, showing in plan the portion of the construction illustrated in Fig. 2.

The elevator 32 is manipulated to raise and lower the advanced end thereof by means of a cable 37. The cable 37 is securely anchored to a bail 38, pivoted at 44 to the elevator frame. The cable 37 is reeved over sheaves 39, 40 and 41 and upon a winch 42. The winch 42 is hand operated by means of a crank handle 43 (see Fig. 3 of the drawings.) In the usual course of operation the cable 37 is slack so that the lower end of the elevator 32 and the scoop connected therewith are at liberty to rise and fall to accommodate the irregularities of the oyster bed. Secured at the same pivotal connection 44 is a second bail 45, to which is anchored a balancing cable 46. The cable 46 is extended over sheaves 47 and 48. At the opposite end of the cable 46 is secured a weight box 49, in which are placed, as desired, balancing weights 50, 50. The cable 46 is anchored to the box 49 by means of an eye-bolt 51 secured at the top of the said box. By means of this arrangement the elevator 32 may be so finely balanced that the end will lift easily when the scoop is thrown to the position to override an obstruction on the bed.

The sheaves 39, 40 and 41 are mounted upon shafts which are extended between, or secured upon, fixed framing booms 52, 52 and 53, 53. The framing booms 52, 52 are connected at the forward end by a cross beam 54. The framing booms 53, 53 are connected across the end by a cross beam 55. On the beam 55, is formed a saddle 56. A similar cross beam saddle 57 is extended between the long upright stanchions 34, 34 supporting the pilot house 36. At the rear of the dredging machine and between the rearmost stanchions 34 thereof, is extended a cross framing beam 58. In the framing beams 54 and 58 are provided eye bolts 59, 59, between which are reeved and secured a series of guy lines 60, 60. The guy lines 60, 60 rest upon the said saddles 56 and 57, and form a truss-like and stiffened construction for the dredging machine and for the operating mechanism manipulating the elevator 32.

Figure 13:
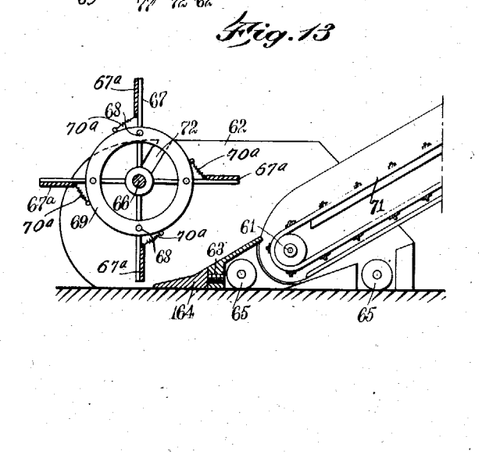
Fig. 13 is a vertical section taken on the line 15—5, of the construction illustrated in Fig. 12.

Pivotally mounted upon a shaft 61 are the several alternative devices employed in the collection of the oysters and in the preparation of the bed therefor. The gathering scoop shown particularly in Figs. 1, 5 and 13 of the drawings, embodies a floor and side pieces 62, 62 connected by an inclined body portion 63 forming the bottom of the scoop. Extended between the side pieces 62, 62 are shafts 64, 64. It is upon the shafts 64, 64 that rollers 65, 65 are mounted. The rollers 65, 65 are provided to carry the scoop and prevent the same from becoming jammed or otherwise held in the bed floor, thereby blocking the machine, causing the breakage of the elevator or parts connected therewith.

Pivotally mounted on a shaft 66, extended between the sides 62, 62, is a reel, the free arms 67, 67 whereof are connected by paddles 67ª and cross rods 68, 68, which are fixedly secured to annular rings 69, 69. The arms 67, 67 are extended from a hub 70 and are held in extended position thereon by spiral springs 70ª. The free ends of the arms 67 are unconnected and are spaced to be disposed in relation sufficiently close to engage the usual medium sized oyster. The rotary path of the ends of the arms 67 is such as to cause the ends of the said arms to sweep the floor of the bed slightly in advance of the forward edge of the bottom 63, thereby elevating or tossing backward upon the said bottom, and therefrom tossing the oysters or other article upon the conveyer 71, which is mounted on the elevator 32. The shaft 66 is mounted in suitable elongated slots 72 formed in the sides 62, 62. The slots 72 thus formed are concentric with the center of an axle 73. The axle 73 forms a bearing for a gear wheel 74, which is meshed with a gear wheel 75 fixed on the end of the shaft 61. By means of the intermeshing of the gears 74 and 75 the rotary direction of the shaft 61 is reversed in transmission to the gear 74. Fixedly mounted upon the gear 74 is any suitable form of sprocket wheel 76. The sprocket wheel 76 is, by means of a sprocket chain 77, geared with a sprocket wheel 78, fixedly mounted upon the shaft 66. By means of this gearing the rotary direction of the gear 74 is imparted to the shaft 66 and the reel embodying the arms 67. The motion thus imparted to the reel and the arms 67 thereof is such that the oysters, or loose objects on the oyster bed are drawn backward and tossed upward on to the inclined bottom 63 and upon the apron of the conveyer 71. The conveyer 71 is a flexible belt, constructed in detail as hereinafter described, which extends over a driving drum 79, the said drum having any suitable form of construction whereby the conveyer belt, as constructed, would be driven. The drum 79 is provided with a shaft 80, driven in the direction shown by the arrows in Fig. 5 of the drawings. It will be seen that the conveyer 71, when traveling as indicated by the arrows, rotates the shaft 61 and the gear 75 connected therewith in such wise as to cause, through the gears 74 and 78 a rotative direction of the reel and arms 67 thereof as illustrated by the arrow in Fig. 5. As stated, this reversion of the rotative travel of the shafts 61 and 66 results in the transference of loose objects, such as oysters, star fish and similar objects, upon the upper side of the conveyer 71, to be carried thereby over the drum 79 at the upper end of the said conveyer.

Figure 1:
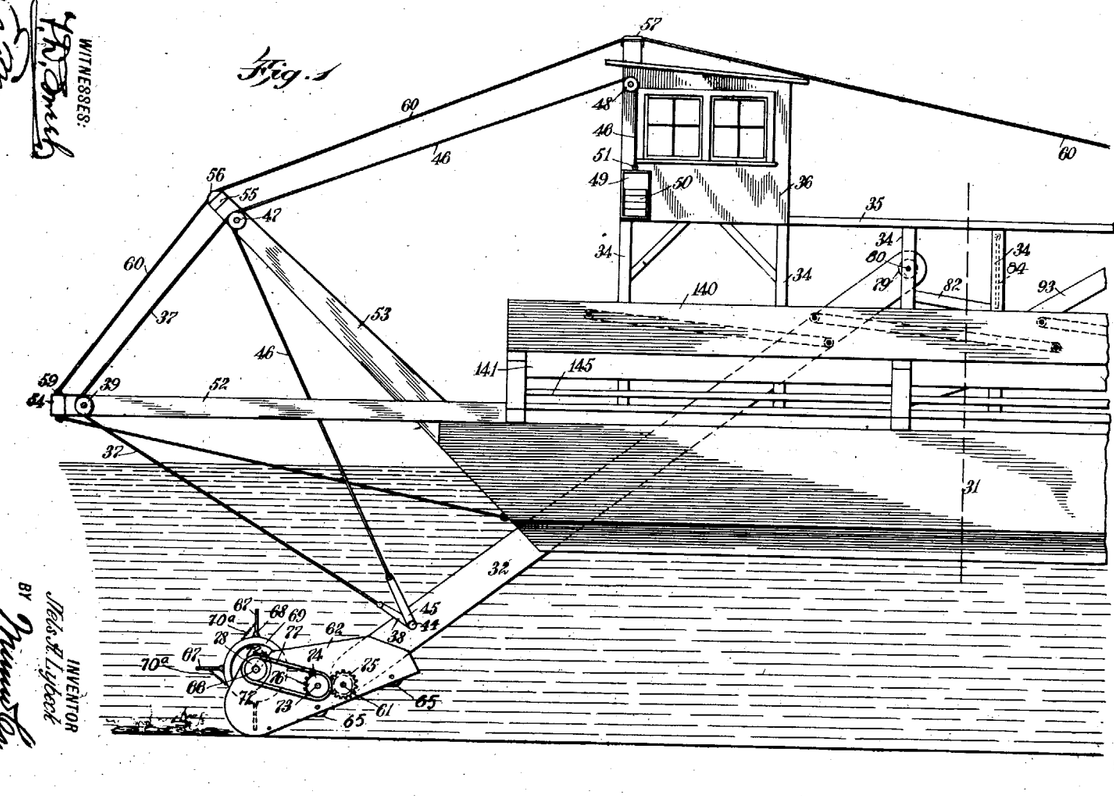
Figure 1 is a fragmentary view in side elevation, of the forward half of a dredging machine constructed in conformity with the present invention.
Figure 5:
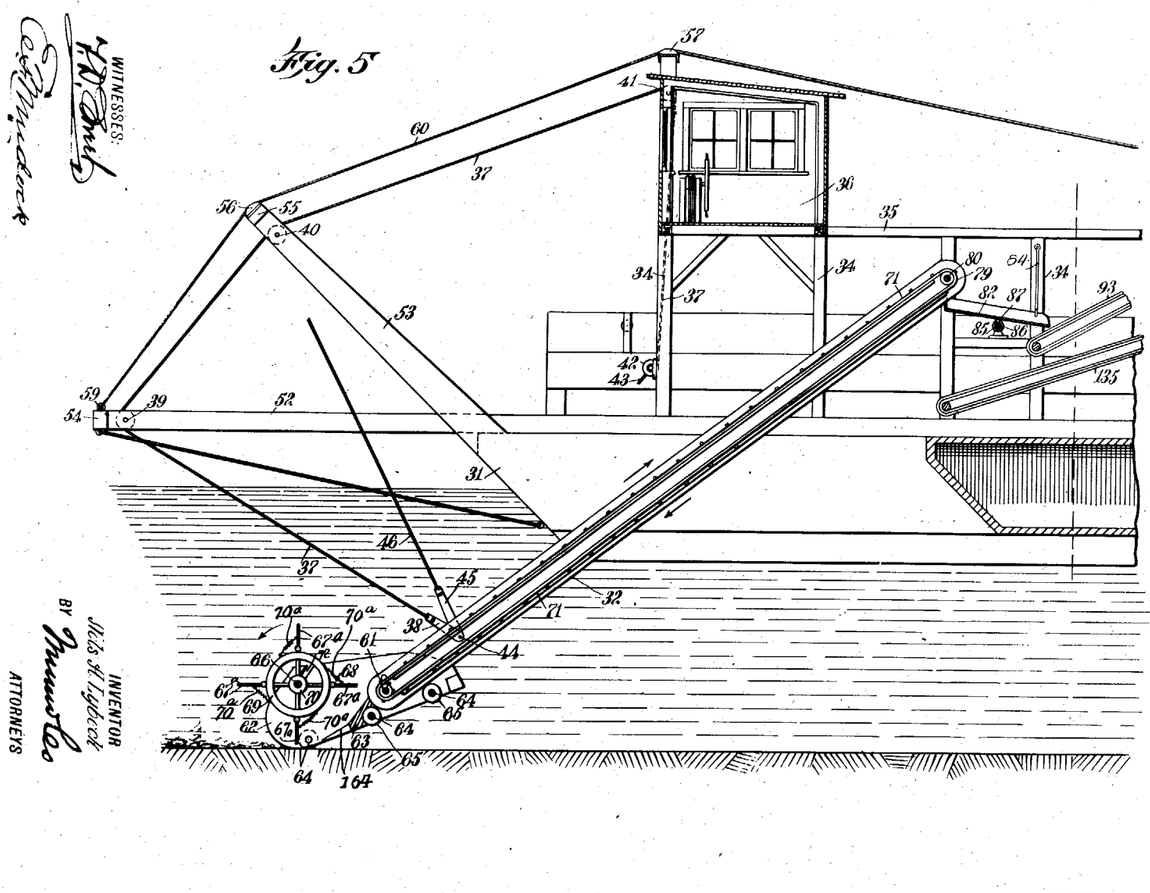
Fig. 5 is a fragmentary view in vertical central longitudinal section, of the portion of the machine illustrated in Fig. 3.
Figure 9:
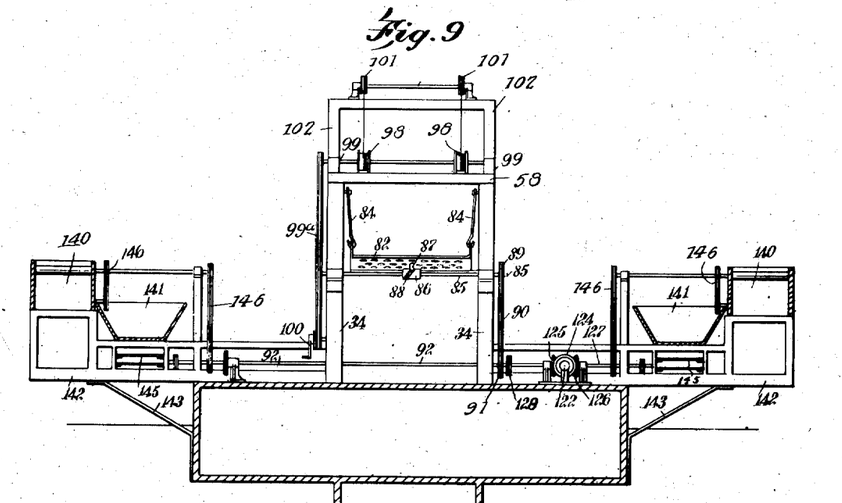
Fig. 9 is a cross section of the machine, taken on the line 9—9 in Fig. 4.

The elevator 32 is disposed at an angle substantially as shown in Figs. 1 and 5 of the drawings. The upper end, where the same passes over the drum 79, is arranged to overhang the upper edge of a slightly inclined tray 82. The tray 82, as shown in plan in Fig. 3 of the drawings, is provided with a series of openings or perforations 83, 83. The openings 83 are formed sufficiently large to pass all objects under a certain definite size. The tray is inclined, as shown in Fig. 5, of the drawings, and is hung in such position by means of hanging hooks 84, 84 and a rotary shaft 85, see Figs. 5 and 9. Upon the rotary shaft 85 is mounted a drum 86 which is provided with a cam-shaped groove 88 which engages a pin 87 in such manner that as the shaft 85 is rotated the tray 82 is vibrated laterally and rapidly.

The shaft 85 is provided with a sprocket wheel 89, which is driven by a sprocket chain 90. The sprocket chain 90 is operatively connected with a sprocket wheel 91, which is fixedly mounted upon a driving shaft 92 of the general driving mechanism.

Figure 2:
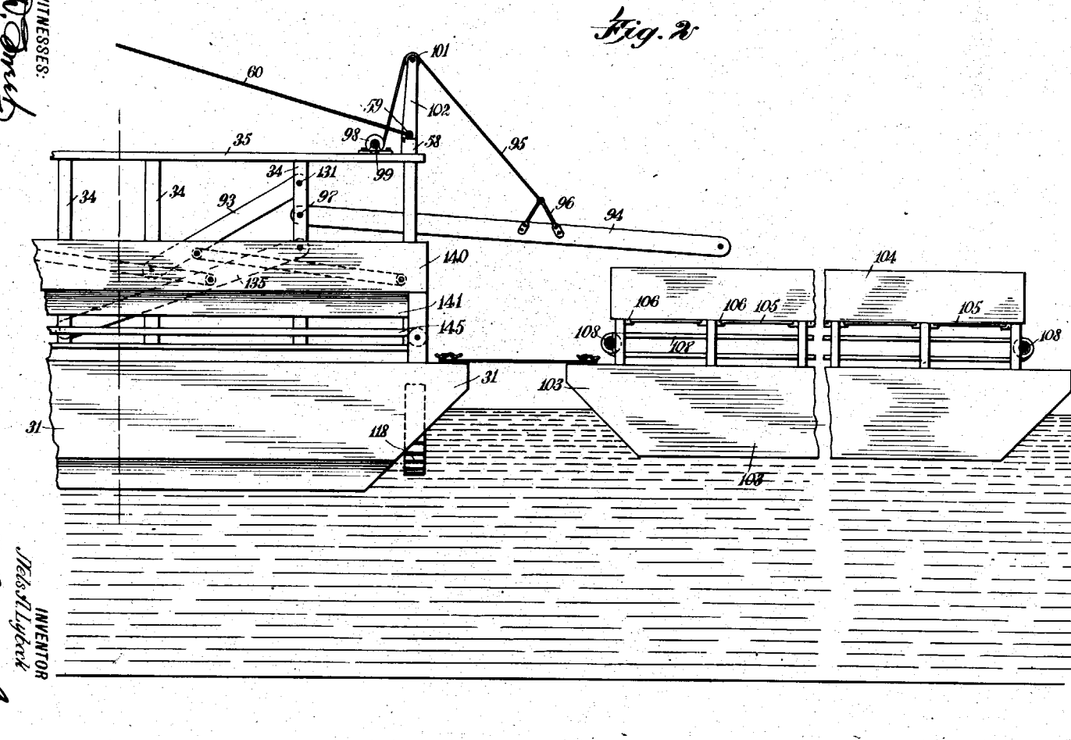
Fig. 2 is a fragmentary view in side elevation, showing a continuation of the view illustrated in Fig. 1, together with a transportation or lighter scow used in connection with the dredging machine.
Figure 6:
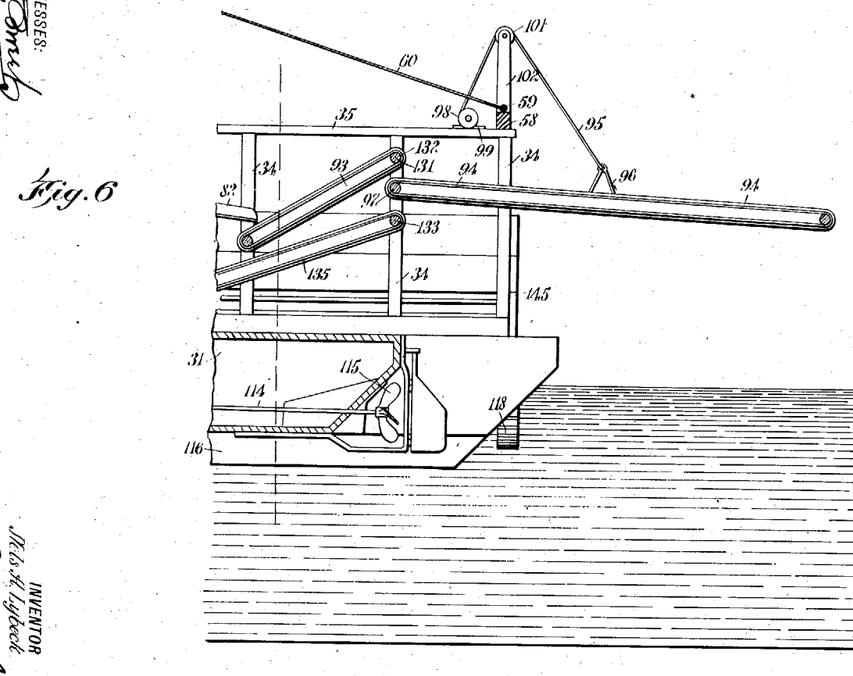
Fig. 6 is a fragmentary view in vertical central longitudinal section, of the rear end of the dredging machine, the lighter scow being detached.

From the tray 82 the oysters and star fish too large to pass the openings 83 are delivered upon a conveyer 93. The conveyer 93 is inclined, as shown in Fig. 6 of the drawings, and the end thereof is extended over the end of a conveyer 94. The conveyer 94 is disposed in a substantially horizontal position, as seen in Fig. 2 of the drawings, where it is suspended by means of a supporting cable 95, which is anchored by means of a bail 96 to the said conveyer 94. The conveyer 94 is pivotally mounted at 97 in the stanchions 34. Upon the stringers 35 are mounted drums 98, the shaft of which is pivoted in bearings 99 and is connected by a chain 99ᵃ to a shaft having a crank handle 100. The cables 95 are reeved over sheaves 101, 101, which are pivotally secured in bearings formed on masts 102, 102, erected upon the framing beam 58. (See Fig. 2 of the drawings.) The conveyer 94 constitutes the apron or delivery medium whereby the selected and clean oysters are delivered to the lighter scow 103, or delivered to the sea, as the case may be. By reason of its substantially horizontal disposition an operator or mechanic stationed near the inner end of said conveyer, may pick from the material as delivered upon the said conveyer the star fish or other foreign substances which have failed to pass through the openings 83 in the tray 82.

Figure 10:
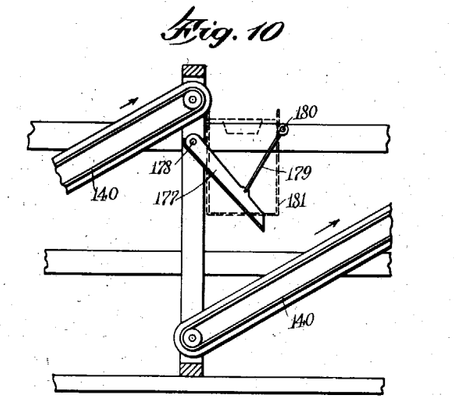
Fig. 10 is a detail view on an enlarged scale and in side elevation, illustrating the mounting of the short conveyers and scoops for delivering the material from one to the other of the short sections, and delivering the same laterally.

Any desired or suitable form of lighter scow may be used; that shown in the drawings differs from the usual construction in that a superstructure of bins 104 is provided. The bins 104 are of the usual hopper form, but are provided at different stations within their longitudinal extensions with slides 105, 105. The slides 105 are slidably held in rabbeted frames 106, 106. The converged lower portion of the bin 104 is disposed directly above a conveyer belt 107. The belt 107 is mounted upon rotary drums 108 disposed at each end of the lighter or scow. By means of the slides 105 the bins 104 may be unloaded gradually by withdrawing the said slides. The unloading process of the scow 103 is employed only when the oysters contained within the said bin are lightered or floated to the shore or shop. One of the said drums 108 is operatively connected with the rotary mechanism for the shop or shore delivery conveyer. A conveyer of necessary or desired length, is so disposed that it may be extended below the delivery end of the conveyer belt 107 on the scow 103. At the opposite end the conveyer is disposed in such manner as to deliver the oysters as received, upon a series of short conveyers. Each of the short conveyers is inclined, as seen in Fig. 10. Under the raised end of each of the said conveyers is a chute for delivering the oysters laterally from the said conveyers, as will be hereinafter more particularly described.

Figure 7:
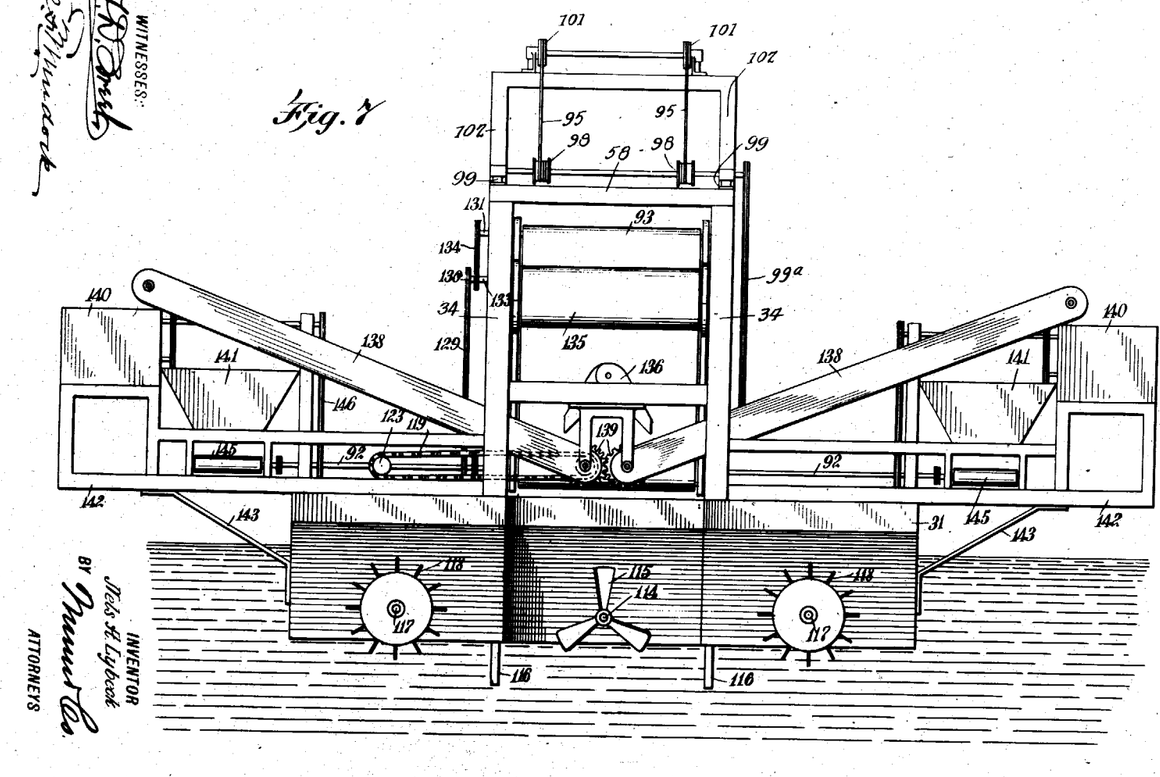
Fig. 7 is a rear end elevation of the dredging machine, slightly enlarged in scale.
Figure 8:
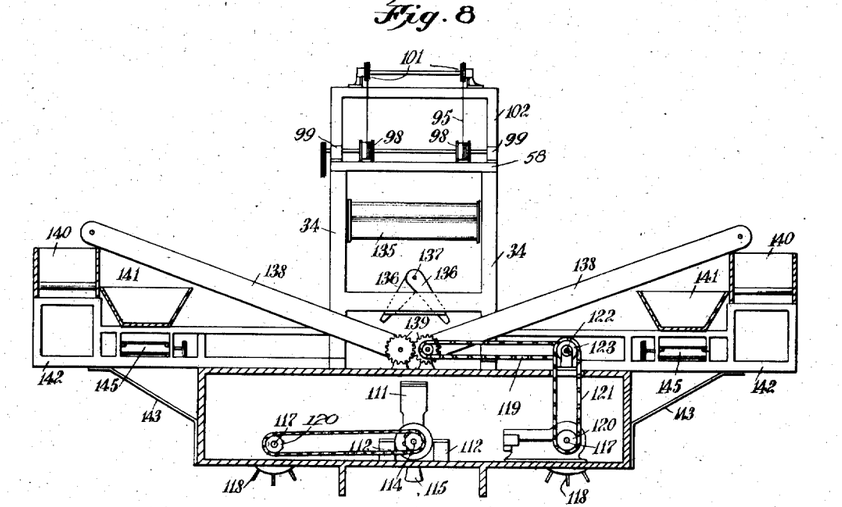
Fig. 8 is a cross section of the machine, taken on the line 8—8 in Fig. 4.

The motor power employed for propelling the dredging machine and the hull 31 thereof may be suited to the needs and desires of the owner or operator. In the drawings is shown an internal combustion engine 111 mounted upon sills 112, 112 and having crank connection with a propeller shaft 114. At the outer end of the propeller shaft 114 is fixedly attached a propeller 115. The ends of the hull 31 are given an overhang, as seen in Figs. 2 and 7 of the drawings. The hull is divided into three sections by means of keels 116, 116. Mounted upon the ends of shafts 117, 117 are small paddle wheels 118, 118. The paddle wheels 118 are disposed substantially as shown in Fig. 7 of the drawings so that the grip of the blades thereof upon the water is such as to shift the rear of the hull laterally in either direction according as the said shafts 117 be revolved. The shafts 117 may be connected in any suitable manner with the main driving shaft of the motor 111. The shafts 117—117 are driven by separate motors. One of said shafts is connected with a shaft 122 disposed above the deck of the vessel and operatively connected therewith by means of the transmission sprocket chain 121. The chain 121 is mounted on the sprocket wheels 120 and 123. This construction is best shown in Fig. 8 of drawings. The wheels 120 in each instance are loosely mounted upon the shafts 117, to be fixedly held thereon by any suitable clutch mechanism with which the said shafts may be provided. One of the shafts 117 is employed as a shaft whereby the transmission is through a sprocket chain 121 to a shaft 122 above the deck of the hull 31. The shaft 122 has at the end and in engagement with the sprocket chain 121, a sprocket wheel 123, while at the other end is fixedly mounted a miter gear 124. The gear 124 is meshed with mated gears 125 and 126 operating a shaft 127 and the shaft 92 in relatively opposite rotary directions. Upon the shaft 92, as before stated, is fixedly mounted the sprocket wheel 91, whereby the sprocket chain 90 and the tray 82 connected therewith are operated. Upon the shaft 92 is a sprocket wheel 128, which is connected by means of a chain 129 with a second sprocket wheel 130. The sprocket wheel 130 is fixedly mounted upon a shaft 131, on which a drum 132 of the conveyer 93 is mounted. The shaft 131 and a shaft 133 are connected by means of a chain 134, thus imparting a driving action to a conveyer 135 similar to that imparted to the conveyer 93.

Above described has been the construction and arrangement of the conveyer 71, the tray 82, the conveyer 93 and the conveyer 94, whereby the selected oysters, and the star fish too large to pass through the openings 83, have been conveyed. The operation of the conveyer 135 and the lateral conveyers connected in series therewith, is such as to provide for the handling of the dwarf oysters, broken shells, small borers and star fish, or other refuse raised from the oyster bed. For the above purpose the lower end of the conveyer 135 is extended below the tray 82 and to the rear end thereof.

The conveyer 135 operates to deliver its load upon a doubly inclined saddle 136. The wings of the saddle 136 are pivoted at 137. When both wings are depressed, as seen in Fig. 8 of the drawings, the material delivered by the conveyer 135 is distributed equally to laterally extended conveyers 138, 138. The conveyers 138 are provided with meshed gears 139. By the intermeshed gears 139, the conveyers 138 are driven in opposite directions, and these outwardly. The outer and upper ends of the conveyers 138, 138 are extended above the short conveyers 140, 140. The conveyers 140 are arranged in series. The conveyers are mounted on rotary shafts and drums formed thereon, and disposed so that they overlap, each of the said conveyers being disposed to deliver its load on the upper surface of the next succeeding conveyer. Extended beside the conveyers 140, 140 are trough-like bins 141, 141. The bins 141 and the conveyers 140 are mounted upon platforms 142, 142, supported from the side of the hull 31 by means of out-rigging brackets 143, 143. Suitably suspended upon the frame work supporting the conveyers 140, 140 are deflecting chutes of a length sufficient to introduce the material when received thereby into the bins 141, 141. By the interposition of any one or more of the said short chutes the product of the particular short conveyer 140, arranged to deliver thereto, is carried to the bin 141 to which it pertains. By the elimination of any or all of the said short chutes, each of the said short conveyers is permitted to deliver its load upon the lower or tail end of the next succeeding short conveyer, to be transferred by it to the short chute provided at the delivery end thereof, or to be again transferred to the next succeeding short chute. By means of this arrangement of conveyers in series, the material delivered by the conveyers to the bins 141, 141 is distributed evenly. The sides of the bins 141, 141 are converged, and the bottoms thereof are provided with a series of slides 144, 144, resembling in construction and arrangement the slides formed in the bins 104, illustrated as attached to the scow 103. Extended longitudinally under the bins 141, 141 are horizontally disposed conveyers 145, 145. The conveyers 145, 145 are driven by means of the transmission mechanism above described, to which they are connected through chains 146, 146. It will be understood that the drums and shafts carried thereby, for supporting the various short length conveyers 140, are operatively connected by means of sprocket chains, whereby the travel of all of the conveyers is accelerated.

The bins 141, 141 are provided for the reception of the refuse and the predatory foes to the oysters. As stated, these consist largely of the star fish and the borers. A large percentage of the star fish are small enough to pass through the openings 83 provided in the tray 82. All of the borers are sufficiently small to pass through the said openings. But as certain of the oysters raised by the elevator 32 are sufficiently small to also pass the said openings, it is wise to sort the contents of the bins 141, and for this purpose the load therein is light, and distributed by means of the manipulation of the short chutes and the short conveyers 140. When the sorting has been carried forward to a point where the oysters have been removed from the refuse and foes, they are placed with the other oysters on the conveyer 94, or placed back into the sea, as the custom or desire dictates. In the operation of the machine, and following the system employed thereby, the dredging machine is constantly at sea or at work, therefore it becomes necessary to discharge the bins 141 into suitable scows or lighters for distribution to the shore, where the said foes and refuse are buried or distributed and thus destroyed. It is for this purpose that the conveyers 145 are employed.

It is deemed convenient to operate the dredging machine in such manner that it may be swung upon a self-contained center. It is for this purpose that the hull 31 is provided with the paddle wheels 118, 118 disposed to operate in the lateral direction, as illustrated in Fig. 7 of the drawings. When called upon to turn the dredging machine by the employment of the small paddle wheels 118, 118, the propeller 115 is arrested, when, by means of suitable clutches, the shafts 117, 117 are rotated to give the proper rotary movement to the said paddle wheels 118, 118. In this manner, and by reason of the adjustment of the paddles of the wheels, the driving impulse is lateral with regard to the extension of the machine and the normal path followed thereby. It is obvious that the evolutions performed by a boat thus equipped, and by the manipulation of the propeller 115 and the laterally disposed paddle wheels 118, may be manifold.

Figure 11:
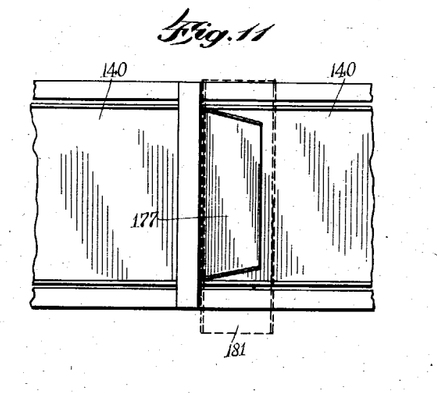
Fig. 11 is a detail view in plan, of the construction illustrated in Fig. 10.
Figure 12:
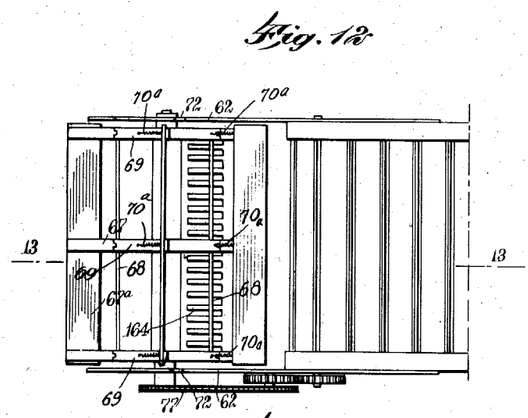
Fig. 12 is a detail view in plan, illustrating the construction of the scoop having the reel attachment.

In Figs. 10 and 11 of the drawings is shown in detail, and on an enlarged scale, the method of mounting the short conveyers forming a series for distributing the debris and foes into the bin 141. A chute 177 shown therein is pivotally mounted at 178, and is provided with one or more elongated hooks 179, adapted to overreach and engage pins 180 set out from the side rails of the runway and framing for the conveyers. When the chute 177 is disposed, as illustrated in Fig. 10, wherein the hooks 179 engage the pins 180 in supported relation, the material received from the conveyers upon the said chute is delivered upon the next succeeding conveyer to be thereby carried forward in the direction indicated by the arrow. When the chute 177 is thus arranged, the chute 181 illustrated in dotted lines in the said figures, is removed. The chute 181 is adjustable on the frame mounting the short conveyers, and may be lifted therefrom. When, however, it is desired that the distribution from any one of the short conveyers shall occur at the delivery end of the said conveyer, then the chute 177 is dropped to a vertical position, while the chute 181 is placed in the position shown in dotted lines in said Figs. 10 and 11. The delivery end of the chute 181 is extended over the bins 141, or other bins provided, as for instance, in the shop wherein the shucking or cleaning and sorting above described is carried on.

Having thus described my invention, what I claim as new and desire to secure by Letters Patent is:

1. An oyster dredging and manipulating machine, comprising a boat hull; an elevator pivotally mounted on and suspended from said hull; a collecting device for delivering to the said elevator; a mechanism for separating the oysters; and conveyers for delivering the separated oysters and refuse to different destinations.

2. An oyster dredging and manipulating machine comprising a boat hull; an elevator pivotally mounted on and suspended from said hull; a collecting device for delivering to the said elevator; a mechanism for separating the oysters; and a system of exposed conveyers disposed on said hull to deliver therefrom and adapted to permit the manual extraction of foreign substances carried by said conveyers.

3. An oyster dredging and manipulating machine comprising a boat hull; an elevator pivotally mounted on and suspended from said hull; a collecting device for delivering to the said elevator; a mechanism for separating the oysters; conveyers for delivering foreign substances and oysters to different destinations; and a system of holding bins to receive the material from said conveyers.

4. An oyster dredging and manipulating machine comprising a boat hull; an elevator pivotally mounted on and suspended from said hull; a collecting device for delivering to the said elevator; a mechanism for separating the oysters; conveyers for delivering foreign substances and oysters to different destinations; a system of holding bins to receive the material from said conveyers; and a plurality of conveyers to deliver the material from said bins.

5. An oyster dredging and manipulating machine comprising a boat hull; an elevator pivotally mounted on and suspended from said hull; a collecting device for delivering to the said elevator; a mechanism for separating the oysters; a system of belt conveyers for delivering the selected article to the operating tables; and a system of belt conveyers for delivering the refuse from the said tables to the dumps provided therefor.

6. An oyster dredging and manipulating machine comprising a boat hull; an elevator pivotally mounted on and suspended from said hull; a collecting device for delivering to the said elevator; a mechanism for separating the oysters; a system of belt conveyers for delivering the selected article to the operating tables; and a system of belt conveyers to deliver the shells to the oyster beds.

7. An oyster dredging and manipulating machine embodying a transfer system comprising a dredging elevator pivotally mounted in the frame of said machine and extended forwardly therefrom; a system of endless belt conveyers extended from the delivery end of said elevator beyond the rear of the said machine to deliver the oysters raised by the said elevator from the bed back to the bed, embodying a sorting section for inspection and removal of refuse or foes from said oysters while in transit.

8. An oyster dredging and manipulating machine embodying a transfer system comprising a dredging elevator pivotally mounted in the frame of said machine and extended forwardly therefrom; a system of endless belt conveyers extended from the delivery end of said elevator beyond the rear of the said machine to deliver the oysters raised by the said elevator from the bed back to the bed, embodying a sorting section for inspection and removal of refuse or foes from said oysters while in transit; a mechanical sorting device interposed between the said elevator and delivery conveyers for mechanically separating the oysters; and a system of conveyer belts for delivering the said debris and foes to holding receptacles.

9. An oyster dredging and manipulating machine embodying a transfer system comprising a dredging elevator pivotally mounted in the frame of said machine and extended forwardly therefrom; a system of endless belt conveyers extended from the delivery end of said elevator beyond the rear of the said machine to deliver the oysters raised by the said elevator from the bed back to the bed, embodying a sorting section for inspection and removal of refuse and foes from said oysters while in transit; and a receiving bin extended below the delivery end of said system independently floated and detachable from said machine.

In testimony whereof I have signed this specification in the presence of two subscribing witnesses.

NELS A. LYBECK.

Witnesses:
E. F. MURDOCK,
PHILIP D. ROLLHAUS.